Patented Feb. 5, 1946

2,394,417

UNITED STATES PATENT OFFICE 2,394,417

ODOR STABILIZED PLASTIC COMPOSITIONS

Victor Yngve, deceased, late of Highland Park, N. J., by Lauchlin M. Currie, executor, Rocky River, Ohio, assignor, by mesne assignments, to Bakelite Corporation, a corporation of New Jersey No Drawing. Application November 28, 1942, Serial No. 467,199

10 Claims. (Cl. 260—36)

Plastic and semi-elastic compositions containing vinyl resins and high boiling softening agents or plasticizers have been put to a wide variety of uses ranging from such industrial functions as insulation for the electrical systems of ships and automobiles to decorative and personal uses in curtains, clothing, shoes, belts and wristwatch straps. While the vinyl resins themselves are inherently odorless and can be formed into plasticized compositions initially without odor, it has been found that nearly all of these plasticized compositions tend to develop odor on aging, and that the extent and rapidity of this development are largely dependent on any heating to which the compositions are subjected either in the course of their formation or in use. In the case of those uses of plasticized vinyl resin compositions which are more or less personal, and to a lesser extent in all uses, odor of any sort is undesired, and constitutes a more or less serious limitation on the usefulness and value of articles made from these compositions. In the case of all uses of plasticized vinyl resin compositions which involve heating of considerable masses of the material, the development of strong or disagreeable or irritating odors constitutes a distinct industrial hazard to the workers exposed to the odors.

This problem is not a new one in the field of plastic compositions generally, and various proposals for its solution have been made with respect to compositions having other than vinyl resins as their basis. Most of the prior proposals have either sought to eliminate the odoriferous or odor-forming substances by extraction of the plastic materials with water or some other solvent appropriate for the offending agencies, or they have been directed to the incorporation of other and dominating but less objectionable odors in the compositions. Neither of these nor any other prior proposal has proved to be particularly fruitful in preventing or overcoming odors developed by plasticized vinyl resin compositions.

This invention is directed to plasticized vinyl resin compositions which are odor stabilized, and the utility and value of the odor stabilized compositions which it provides will be apparent.

The odor stabilized plasticized vinyl resin compositions of this invention are made by intimately admixing in the composition a small amount of a relatively non-volatile organic acid anhydride. The anhydride may be that of a mono- or polycarboxylic acid, and aromatic as well as saturated or unsaturated aliphatic acid anhydrides are suitable, or the anhydride may include two different acyl groups. A few examples of satisfactory organic acid anhydrides for the practice of this invention are those of maleic, citraconic, lauric, stearic, sebacic, benzoic, phthalic, naphthalic and endo-methylene tetra- and hexahydrophthalic acids. It is essential only that the anhydride used shall not evaporate, sublime, polymerize, decompose or otherwise lose its identity as an anhydride in the compositions at temperatures up to about 200° C., that is, at the maximum temperatures to which the vinyl resin compositions may be subjected in their preparation or fabrication.

The amount of the odor stabilizer (organic acid anhydride) used in the vinyl resin compositions may range from about 0.25% to about 5% of the weight of the plasticized composition. Within this range, quantities amounting to around 0.5% to 1% are most generally desirable. The organic acid anhydride may be added to the plasticized vinyl resin compositions at any time during their formation and in any manner which achieves intimate admixture of the anhydride with the balance of the composition. These compositions are usually made by at least partially fluxing the ingredients together while undergoing mastication, as, for example, on differential roll mills or in internal mixing or kneading devices. The organic acid anhydride can be conveniently added to the compositions during such forming operations as these, preferably near the completion of the operation. Other procedures of forming the plasticized compositions are known and some of them employ solvent or non-solvent liquid media. The organic acid anhydride may be incorporated equally well in such procedures provided the liquids used do not react with or destroy the anhydride.

The vinyl resins which form the basis of the compositions to which this invention is directed may be any resins of this genus which are known and which are used in plasticized form. Examples of such resins are polymerized vinyl chloride which may or may not be further chlorinated after polymerization, resins made by conjointly polymerizing vinyl chloride with such vinyl organic esters as vinyl acetate and which possess various chlorine contents, and other polymers and co-polymers derived in part or entirely from vinyl chloride, as well as polyvinyl acetal and partial acetal resins, polymerized styrene resins, and, less commonly, polymerized vinyl acetate resins. The plasticizers may include any of those heretofore proposed for use in association with vinyl resins of these types, and probably several hundred substances have been so proposed. Chief among such known plasticizers are the high-boiling esters of aliphatic and aromatic mono- and polyhydroxy compounds with inorganic and organic acids. This invention is concerned only with plasticized vinyl resin compositions which include a significant proportion, say, 10% or more, of at least one such high-boiling ester plasticizer, and the compositions to which the invention has greatest applicability are those containing from about 25% to 60% of the ester plasticizer. Members of the class of high-boiling ester plasticizers useful in vinyl resin plastic compositions are both numerous and well known. Typical esters are, for example, the phenyl and cresyl phosphates; the polyglycol dihexoates and dioctoates; phthalic, succinic and sebacic acid diesters of monohydric aliphatic and aromatic alcohols, and of polyhydric alcohols including the glycols; mixed esters of hydroxy carboxylic acids with both alcohols and other acids; and various compounds achieved through inter- and cross-esterification of mono- and polybasic acids with mono- and polyhydric alcohols.

In addition to the essential vinyl resin base and high-boiling ester plasticizers, the compositions may and usually do contain other ingredients in lesser proportion. For example, pigments, lakes, dyes and other coloring materials; organic or inorganic filling or opacifying materials; lubricants, such as oils and waxes of various kinds; metal oxides and salts or organo-metallic compounds which serve as stabilizers against discoloration or decomposition by the action of heat or light; and other ingredients of specialized purpose may be present. This invention is unconcerned with the presence or absence of any components of the plasticized compositions other than the vinyl resin and the high-boiling ester plasticizer, and it is to be understood that in the event these two components do not make up the predominant part of the compositions, say, two-thirds of their weight or more, the proportions of odor stabilizer need be based only on the combined quantities of vinyl resin and plasticizer present.

The examples following illustrate the invention:

*Example 1.*—A plasticized composition was made from a vinyl resin resulting from the conjoint polymerization of vinyl chloride with vinyl acetate (containing about 94% by weight of vinyl chloride) and dioctyl phthalate. This composition contained 64% by weight of the vinyl resin and 32% by weight of the plasticizer, the balance being carnauba wax lubricant, heat stabilizing and coloring materials. As prepared, the composition was without appreciable odor.

One portion of the composition was worked on a differential roll mill at about 135° C. for 8 minutes. At the end of this period it was observed to possess a pronounced "fishy" odor. To another portion of the composition was added 0.5% by weight of phthalic anhydride, and this portion also was milled at about 135° C. After 16 minutes of this accelerated heat treatment, the odor of this portion of the composition was found not to have changed perceptibly from that of the original composition.

Similar results were secured using 0.75% by weight of naphthalic anhydride as the odor stabilizer instead of the phthalic anhydride.

*Example 2.*—A composition was prepared which contained 55.5% by weight of the vinyl resin described in Example 1, and 41% by weight of ester plasticizer which was a mixture of tricresyl phosphate and triethylene glycol dioctoate, the balance of the composition being white pigment, lubricant and heat stabilizing materials. This composition initially was without appreciable odor.

On accelerated heating, samples of the composition rapidly developed a pronounced and rather disagreeable odor. After adding 0.5% by weight of phthalic anhydride, 1.0% of sebacic anhydride and 0.75% of stearic anhydride to other samples of the composition, the same and even more severe heating did not cause these compositions to develop appreciable odor.

*Example 3.*—A composition identical with that of Example 2 except that it was colored with black pigment was prepared. Initially, this composition was not appreciably odorous.

When large amounts of this composition were processed on heated rolls in the course of fabrication into electrical insulation, the development of odor became sufficiently strong to cause illness and nausea on the part of operatives of the fabrication process.

Five samples of this same composition in which respectively were incorporated 1% by weight of maleic anhydride, of phthalic anhydride, of each of endo-methylene tetra- and hexahydrophthalic anhydrides, and of citraconic anhydride did not develop objectionable odor when heated on a roll mill at temperatures and for times comparable to those of the fabrication operations mentioned above.

Other compositions in which tricresyl phosphate, alone and in admixture with dioctyl phthalate, was used as the plasticizer for a vinyl resin as described above, and compositions containing polyvinyl partial butyral resins plasticized with triethylene glycol di (2-ethyl butyrate) also were found to develop objectionable odor on aging or on extended or severe heating. In each case it was found that the addition, to the composition of a small amount, less than 5% by weight, of organic acid anhydride stabilized these compositions against development of appreciable odor.

It may be that the odor stabilizers of this invention function by combining with any adventitious quantities of water present in the plasticized compositions and thereby prevent hydrolysis of the ester plasticizers, or that their success is due to the combination of the acid anhydrides with substances liberated by hydrolysis or decomposition of the plasticizer. It also is possible that the acid anhydrides serve to reduce oxidation of substances liberated by hydrolysis or decomposition of ingredients of the compositions. Whatever action is involved, this invention is of value in odor stabilizing ester plasticized vinyl resin compositions, and its objects are accomplished by incorporation in the compositions of a small amount of at least one relatively non-volatile organic acid anhydride. Variations and modifications of the compositions other than those specifically pointed out are possible, and are included within the scope of the invention as defined by the appended claims.

What is claimed is:

1. Odor stabilized plastic composition comprising a vinyl resin which is a conjoint polymer of vinyl chloride with vinyl acetate, and an ester plasticizer for the vinyl resin, stabilized against the development of odor by the incorporation in the composition of from about 0.25% to about 5% of the combined weight of vinyl resin and plasticizer of phthalic anhydride.

2. Odor stabilized plastic composition comprising a vinyl resin which is a conjoint polymer of vinyl chloride with vinyl acetate, and dioctyl phthalate, stabilized against the development of odor by the incorporation in the composition of from about 0.25% to about 5% of the combined weight of vinyl resin and plasticizer of phthalic anhydride.

3. Odor stabilized plastic composition comprising a vinyl resin which is a conjoint polymer of vinyl chloride with vinyl acetate, and tricresyl phosphate, stabilized against the development of odor by the incorporation in the composition of from about 0.25% to about 5% of the combined weight of vinyl resin and plasticizer of phthalic anhydride.

4. Odor stabilized plastic composition comprising a vinyl resin which is a conjoint polymer of vinyl chloride with vinyl acetate, and a polyglycol dioctoate, stabilized against the development of odor by the incorporation in the composition of from about 0.25% to about 5% of the combined weight of vinyl resin and plasticizer of phthalic anhydride.

5. Odor stabilized plastic composition comprising a vinyl resin having polymerized therein a vinyl compound containing but one olefinic bond, and an ester plasticizer for the resin in an amount between about 25% and 60% of the combined weight of the resin and plasticizer, stabilized against the development of odor by the incorporation in the composition of from about 0.25% to 5% of the combined weight of the resin and plasticizer of phthalic anhydride.

6. Method of combining an ester plasticizer and a vinyl resin having polymerized therein a vinyl compound containing but one olefinic bond, to form a solid plastic composition, which comprises milling said resin with from about 25% to 60% of the plasticizer by weight of the composition, at compounding temperatures such that strong and irritating odor is ordinarily developed due to the presence of the plasticizer, and inhibiting the development of such odor by carrying out the milling with the addition to the composition of from about 0.25% to about 5% by weight of the composition of a carboxylic acid anhydride which is substantially nonvolatile at temperatures up to about 200° C., and thereby obtaining a solid plastic composition substantially free from such odor.

7. Method of combining an ester plasticizer and a vinyl resin containing vinyl chloride polymerized therein, to form a solid plastic composition, which comprises milling said resin with from about 25% to 60% of the plasticizer by weight of the composition, at compounding temperatures such that strong and irritating odor is ordinarily developed due to the presence of the plasticizer, and inhibiting the development of such odor by carrying out the milling with the addition to the composition of from about 0.25% to about 5% by weight of the composition of a carboxylic acid anhydride which is substantially non-volatile at temperatures up to about 200° C., and thereby obtaining a solid plastic composition substantially free from such odor.

8. Method of combining an ester plasticizer and a homo-polymer of vinyl chloride, to form a solid plastic composition, which comprises milling said resin with from about 25% to 60% of the plasticizer by weight of the composition, at compounding temperatures such that strong and irritating odor is ordinarily developed due to the presence of the plasticizer, and inhibiting the development of such odor by carrying out the milling with the addition to the composition of from about 0.25% to about 5% by weight of the composition of a carboxylic acid anhydride which is substantially non-volatile at temperatures up to about 200° C., and thereby obtaining a solid plastic composition substantially free from such odor.

9. Method of combining an ester plasticizer and a vinyl resin which is a conjoint polymer of vinyl chloride with vinyl acetate, to form a solid plastic composition, which comprises milling said resin with from about 25% to 60% of the plasticizer by weight of the composition, at compounding temperatures such that strong and irritating odor is ordinarily developed due to the presence of the plasticizer, and inhibiting the development of such odor by carrying out the milling with the addition to the composition of from about 0.25% to about 5% by weight of the composition of a carboxylic acid anhydride which is substantially non-volatile at temperatures up to about 200° C., and thereby obtaining a solid plastic composition substantially free from such odor.

10. Method of combining an ester plasticizer and a vinyl resin having polymerized therein a vinyl compound containing but one olefinic bond, to form a solid plastic composition, which comprises milling said resin with from about 25% to 60% of the plasticizer by weight of the composition, at compounding temperatures such that strong and irritating odor is ordinarily developed due to the presence of the plasticizer, and inhibiting the development of such odor by carrying out the milling in the presence of from about 0.25% to about 5% by weight of the composition of phthalic anhydride and thereby obtaining a solid plastic composition substantially free from such odor.

LAUCHLIN M. CURRIE,
*Executor of the Last Will and Testament of Victor Yngve, Deceased.*